United States Patent [19]

Martin

[11] 4,316,866
[45] Feb. 23, 1982

[54] PROCESS AND APPARATUS INVOLVING A CUTTING WIRE SPOOLING SYSTEM FOR CUTTING BRICK AND TILE

[75] Inventor: Albert R. Martin, Snyder, Tex.

[73] Assignee: R. Martin & Associates, Snyder, Tex.

[21] Appl. No.: 191,247

[22] Filed: Sep. 26, 1980

[51] Int. Cl.³ .............................................. B28B 11/14
[52] U.S. Cl. .................................. 264/157; 425/307; 425/308
[58] Field of Search ...................... 264/157, 145, 146; 425/289, 308, 309, 307

[56] References Cited

U.S. PATENT DOCUMENTS

| | | | |
|---|---|---|---|
| 734,124 | 7/1903 | Frey | 425/289 |
| 1,555,769 | 9/1925 | Steele | 83/651.1 |
| 2,074,695 | 3/1937 | Jimerson | 83/651.1 X |
| 2,443,928 | 6/1948 | Passarelli | 83/651 X |
| 3,019,893 | 2/1962 | Jacobs et al. | 242/131 X |
| 3,065,514 | 11/1962 | Jakobsson et al. | 264/157 |
| 3,395,204 | 7/1968 | Olsson et al. | 264/157 |
| 3,435,093 | 3/1960 | Cope | 260/357 |
| 3,461,196 | 8/1969 | Bowles | 264/157 X |
| 3,516,957 | 6/1970 | Gray, Jr., et al. | 260/22 |
| 3,639,527 | 2/1972 | Brinkmann et al. | 260/873 |
| 3,734,991 | 5/1973 | Vrijma | 264/157 |
| 3,919,372 | 11/1975 | Vogele | 264/157 X |
| 3,927,687 | 12/1975 | Thierman | 242/100.1 X |

FOREIGN PATENT DOCUMENTS 7901605  2/1978  Netherlands .
7901609  2/1979  Netherlands .

*Primary Examiner*—Philip Anderson
*Attorney, Agent, or Firm*—Wendell Coffee

[57] ABSTRACT

Cutting wire for a brick and tile cutting and setting machine is wound on supply spools. A plurality of the supply spools are mounted below the cutting frame of the machine. The supply spools are braked to prevent rotation by inflatable brake hoses. When the hoses are inflated, they push against the spool. The wire from the supply spool extends across the cutting frame to a take up spool. The take up spools are mounted on a shaft for rotation. After a set number of bricks have been processed, the wire is spooled from the supply spool to the take up spool so that new, unworn wire is stretched across the cutting frame. The wire on the supply spools is held in place by a flat spring which prevents the wire from unwinding.

16 Claims, 7 Drawing Figures

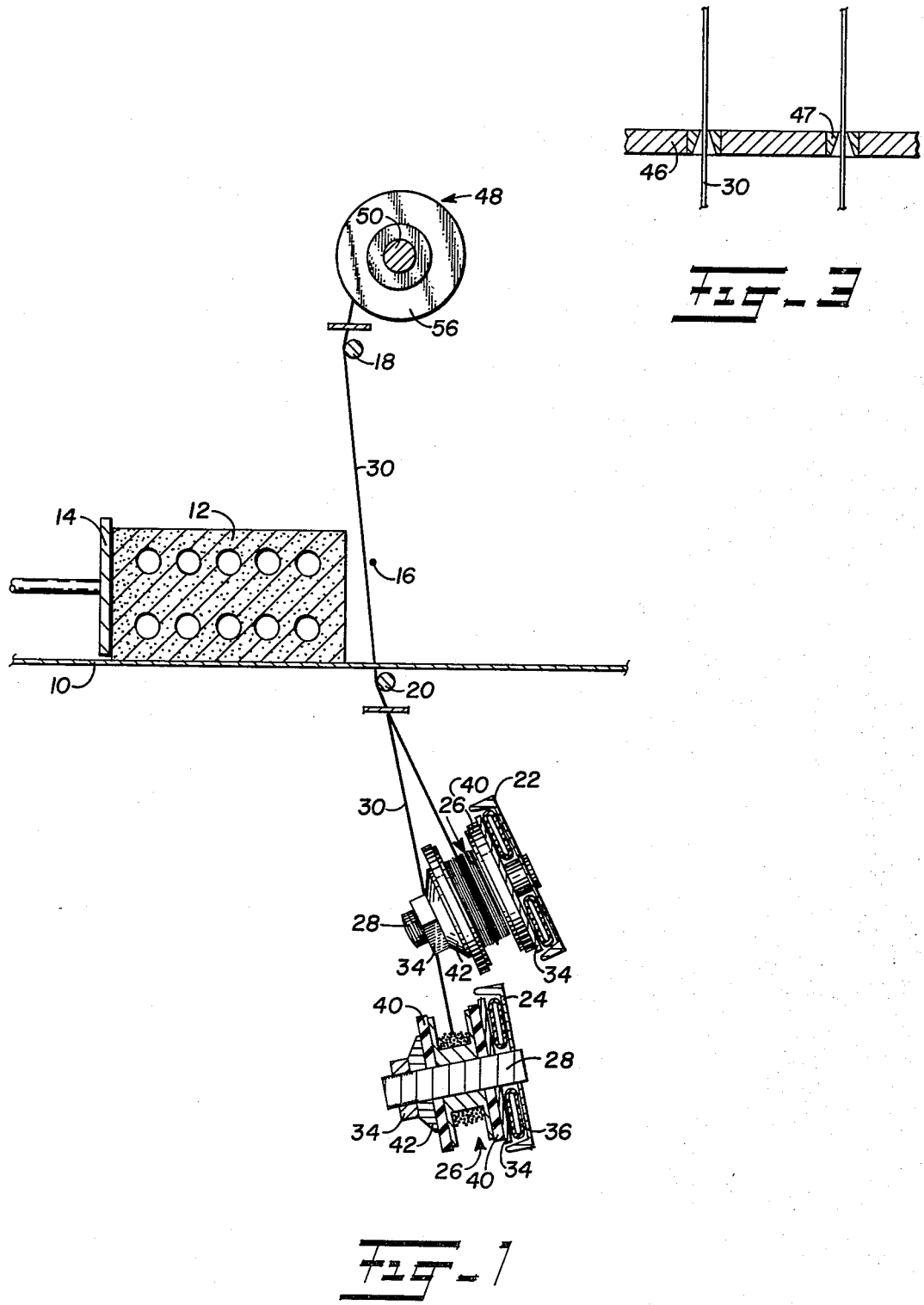

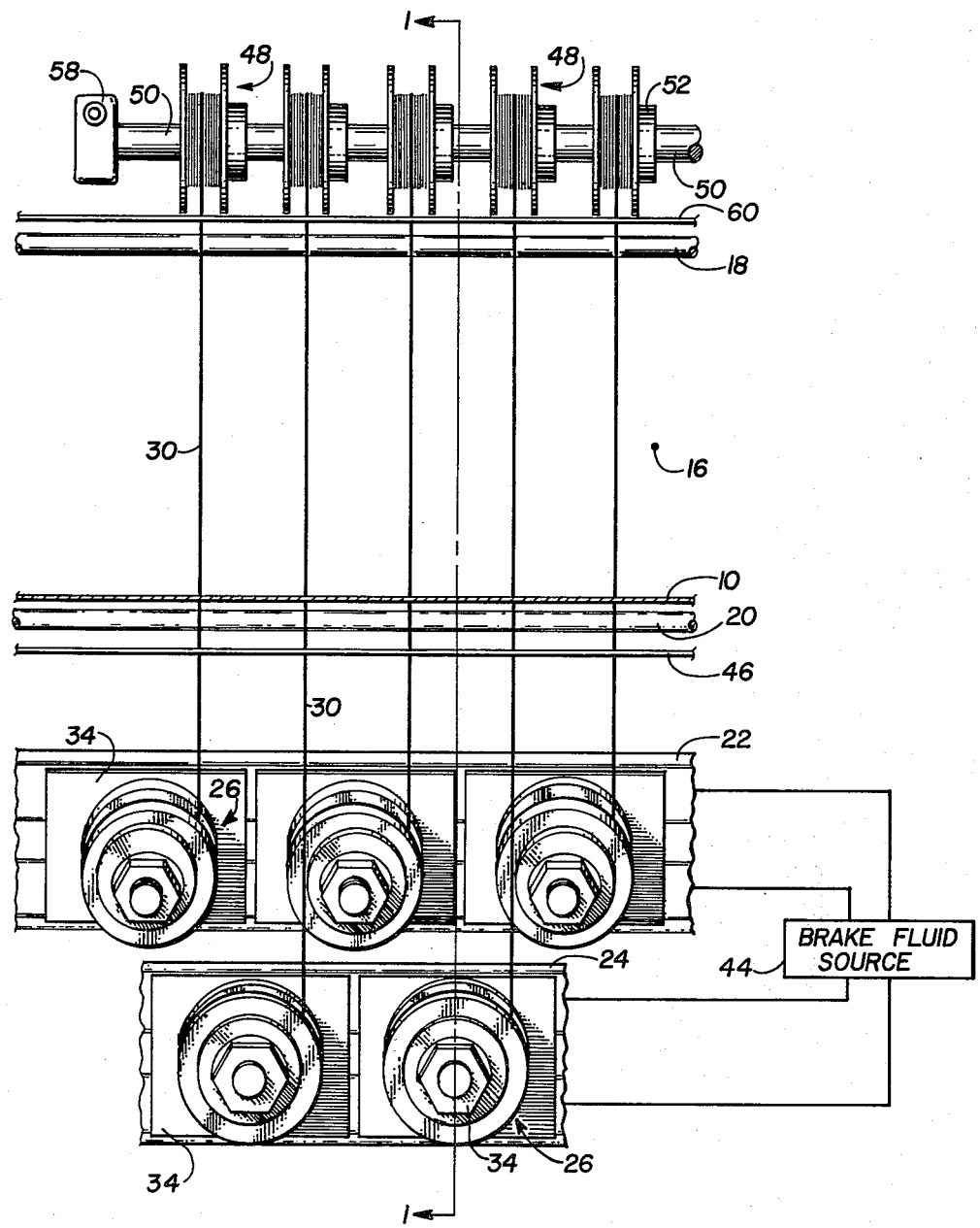
Fig_2

PROCESS AND APPARATUS INVOLVING A CUTTING WIRE SPOOLING SYSTEM FOR CUTTING BRICK AND TILE

CROSS REFERENCE TO RELATED APPLICATIONS

None, however applicant filed a disclosure document Ser. No. 088,899 on Mar. 6, 1980 which document concerns this application; therefore, by separate paper it is respectfully requested that the document be retained and acknowledgement thereof made by the Examiner. (MoPEP 1706).

BACKGROUND OF THE INVENTION

1. Field of the Invention

This invention relates to ceramics and more particularly to a brick and tile cutting and setting machine. Specifically this invention relates to the cutter wires for such a machine.

2. Description of the Prior Art

The use of automatic cutting and setting machinery in the brick and tile industry has become almost universal. These machines are designed so that long bars or slugs of extruded clay or shale are forced through a bank of multiple steel cutting wires spaced to slice the slugs into the desired brick or tile dimension. Traditionally, the cutting wire are supplied in standard 32" length with loops formed on either end for simple and convenient mounting on the cutting wire frame. It will be seen, that even though the cutting wires are quite long, only 8" (in the case of double high slug cutting), or 4" (single high mode), of the wire is actually used. When this short section near the center of the cutting wire wears thin and breaks, a great proportion of the wire, even though completely unused, must be discarded.

Successful operation of any automatic cutting and setting machine requires immediate shutdown of the entire extrusion line and handling system when a cutting wire breaks. Consequently, by far the major proportion of machine outage is due to broken cutting wires. On some plants, working hard, highly abrasive shales, loss of production due to cutting wire failure is very significant. Other plants working "smooth" or "soft" clays, the loss is not nearly so great. However, any clay or shale is inherently abrasive to some degrees so the broken cutting wire specter is universal in the clay products industry.

It is exceedingly rare for a new, full gauge cutting wire to break in service unless some foreign material is extruded in the clay slug. The wires commence to break after a number of slugs have been passed through the wire bank and the wires have become worn in a "knife blade" shape in cross section. This wearing of the cutting wires is particularly insidious because as the wire wears flat it tends to weave through the clay slug rather than slice cleanly through, resulting in crooked or wavy edges on the brick. Thus, in addition to the ever increasing danger of breakage as a cutting wire wears, poor quality brick are produced.

There is a time when the wires are sufficiently worn that it is desirable to replace all of the wires. This occurs regularly. The machine is out of operation when the wires are being replaced.

After I made this invention and before filing a patent application, a search was made in the U.S. Patent and Trademark Office upon this invention. This search revealed the following U.S. Pat. Nos.: Steele—1,555,769; Jimerson—2,074,695; Heft—2,302,371; Passarelli—2,443,928; Theirman—3,927,687.

Theirman discloses a dental floss advancer. Steele discloses a brick cutter that does not use an advancing wire. Jimerson discloses mining equipment for sawing pillars.

Heft shows a butter slicer. Passarelli discloses a manual cheese slicer.

In addition to that in the preparation of patent application the attorney preparing the patent application was aware of Jacobs Et Al Bobbin Hobble, U.S. Pat. No. 3,019,893 which discloses a hobble made of a transparent spring material to extend around a sewing machine bobbin to prevent the thread from being tangled when not in use.

SUMMARY OF THE INVENTION

New and Different Function

I have invented a automatic wire spooler wherein long lengths of steel cutting wire are wound upon the supply spools. This wire being a hard carbon steel wire is springy and therefore I found it necessary to invent a flat spring to place over the wire on the spools to keep them from unwinding while in transportation and installation.

The supply spools are mounted upon the machine adjacent to the cutter frame. The spools are prevented from unwinding freely by fluid within the inflatable brake hoses. Brake hoses extend between the spool frame and the base of the spool to exert pressure upon the spool when free release of the wire is not permitted. The wire extends from the supply spool and is stretched across the cutter frame to take-up spools. After a predetermined amount of material has been cut (for example, 15,000 bricks) in a few seconds the brake is released and the wire is rolled onto the take-up spools so that new wire is presented to the slugs being pushed through the cutter frame.

The wire is threaded through small openings in a guide bar and spill snubber. Therefore if the wire breaks it does not immediately come unwound from the spool. The broken wire will be no greater than the distance across the cutting frame, which is basically the distance between the guide bars.

Since only a very short time is required to reel the wire across the cutter frame, the new wire may be brought across the cutter frame at more frequent intervals than before. That is to say that there is no machine-down time to bring new wire into use nor is there any labor involved. The only expense of putting new wire in place is the cost of the wire itself. It will also be understood that in the prior art that only about a fourth or eighth of the wire was used. However, with my invention if the slug being cut is 8 inches thick, each time the wire is advanced, it can be advanced for only slightly more than the 8 inches being cut so that substantially all the wire is worn or used. Therefore, even if the wire were changed twice as frequently as before, still the total footage of wire would be less than before.

The following are advantages resulting from this invention:

1. Loss of production time due to wire failure is practically eliminated.
2. Quality of the material cut is improved because wire "weave" is greatly reduced.
3. Accident hazard associated with operation of this type machinery is reduced.

A. Flying ends of broken cutting wires are dangerous and have resulted in injury on several occasions. Both ends of the wire will be solidly secured at all times with this invention. If the operator fails to set the machine on "safe" when replacing a broken wire, it is possible for the pusher to come forward when the run permit circuit is reestablished. The operator, being down on the base platten replacing the wire, can be caught by the pusher and forced into the cutting wires. This has resulted in very serious injury in the past.

4. With this invention, wire changing operations will be a deliberate, scheduled occurrence rather than a hurried necessity under pressure of making production.

Thus it may be seen that the total function of my invention far exceeds the sum of the functions of the individual spools, brake hoses, shafts, springs, etc.

Objects of This Invention

An object of this invention is to cut clay slugs into bricks.

Further objects are to achieve the above with a device that is sturdy, compact, durable, simple, safe, efficient, versatile, ecologically compatible, energy conserving, and reliable, yet inexpensive and easy to manufacture, install, adjust, operate and maintain.

Other objects are to achieve the above with a method that is versatile, ecologically compatible, energy conserving, rapid, efficient, and inexpensive and does not require highly skilled people to install, adjust, operate, and maintain.

The specific nature of the invention, as well as other objects, uses, and advantages thereof, will clearly appear from the following description and from the accompanying drawing, the different view of which are not scale drawings.

BRIEF DESCRIPTION OF THE DRAWINGS

FIG. 1 is a side sectional view of a cutting frame of a brick and tile cutting and setting machine with my invention attached thereto, taken substantially on line 1—1 of FIG. 2.

FIG. 2 is a partial end elevational view of the invention with some parts shown schematically.

FIG. 3 is a sectional detail view of the guide bar.

DESCRIPTION OF THE PREFERRED EMBODIMENTS

Figure 5:
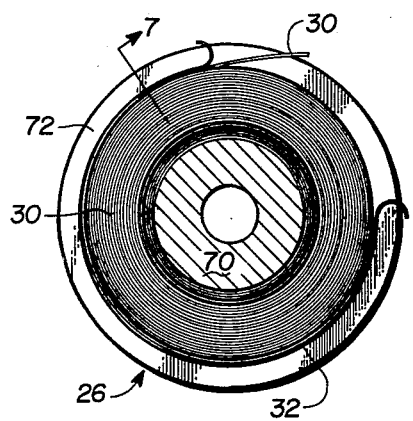
FIG. 5 is a cross-sectional view of a supply spool full of cutting wire.

As indicated above, standard brick and tile cutting and setting machines include base platten 10. Clay slugs 12 are stacked upon the platten in a cutting position. They are pushed by pusher face 14 through cutter frame 16. A series of wires extend across the cutter frame and therefore as clay slugs 12 are pushed through the cutter frame they are cut into individual bricks. Also the machines have top guide roll 18 and a bottom guide roll 20 which maintain the wire in place.

Rolls 18 and 20 are notched at precise intervals to precisely set the width of the bricks which will be cut thereby. The wire stretches across these rolls.

It is upon this standard machine that I have made my invention to stretch the wires across the cutter frame 16.

Upper and lower spool frames 22 and 24 are added to the machine. The upper and lower spool frames 22 and 24 are in the form of channels. Supply spool 26 is journaled about axle 28 which is connected to the frames 22 and 24. Steel wire 30 is wound upon the supply spool 26. Wire 30 is held on the spool by flat spring 32 as will be more particularly described later. Rectangular back brake plate 34 fits behind the spool, that is to say between the spool and the channel. The brake plate 34 has a width about equal to the channels that form the spool frames 22 and 24 so that there will be no rotation. Inflatable brake hose 36 extend along the channel between the channel of the frames 22 and 24 and the plates 34.

The spools are held by retaining nut 34 threaded to the end of the axle 28. Neoprene washer 40 extends between the back plate 34 and the spool 26. Another neoprene washer 40 extends between the other side of the spool 26 and front brake disc 42. Therefore it may be seen that if there is no pressure upon the hose 36 that there will be no brake applied to the spools and the spools may turn freely upon the axle 28. However if the brake hoses 36 are inflated from brake fluid source 44 the pressure from the hose 36 will push against the brake plates 34 pushing the two neoprene washers 40 against the spool preventing its rotation. If the rotation is not absolutely prevented, its rotation is restricted.

As seen from the drawings the wire 30 extends from the spools on the lower frame 24 and bend around the bottom roll 20. That is to say that the wire from the spool will be behind a line connecting the outer face of the bottom roll 20 and top roll 18. The wire from the spools on the upper spool frame 22 will form a sharper angle inasmuch as the upper spool frame is spaced back so the wires do not foul the upper spools.

Lower wire guide bar and spill snubber 46 is mounted upon the machine between the bottom roll 20 and the upper spool frame 22. Each wire is threaded through a hole in the guide. It will be understood that not only do the guides hold the wire in the proper position along the cutter frame 16, but also if a wire breaks in the cutter frame 16, it will not readily reverse itself through the lower guide 46 and therefore there is not a tangle of high carbon steel wire 30 to foul the machine. The holes are in silicon carbode inserts 47 (FIG. 3.).

The wire 30 is stretched across the cutting frame and extends in front of the face and against the face of the top roll 18. From there it is wound onto take up spool 48. The take up spool is mounted upon take up shaft 50. The take up spool 48 has an external hub 52. Diametrical hole 54 extends through the hub 52 and also a corresponding hole extends through the take up shaft 50. Therefore each of the take up spools of the series of take up spools 48 may be pinned or attached to the shaft 50 to rotate therewith. With pin 56 removed the take up spool will turn freely on the shaft. Rotation means 58 is provided upon the take up shaft 50 to rotate it as desired.

Top guide 60 is mounted immediately above the top roll 18. Basically the top guide performs the same function as the lower guide 46. The top guide 60 and lower guide 46 each have silicone carbide wire inserts 47 so that they are not worn and maintain the proper size. As may be seen the hole is larger on the lower side so that the wire may be threaded into it and smaller on the upper side so that the wire forms a close fit (but not snug) so that it does not move outward.

To initially thread the machine the supply spools are placed upon the spool frames 22 and 24 and assembled as shown. The wire is threaded through the lower guide 46 across the cutter frame 16 and in front of the bottom roll 20 and the top roll 18 through the top guide 60 and onto the take up spool. One of the side discs 62 of spool 48 has slit 64 in it and the wire can be pulled through the slit to hold it in place. The initial attachment is made with the brake released. After all of the wires are on the take up spool the brake is set and each of the take up spools are rotated to tighten the wire and to align the hole 54 with the hole in the take up shaft 50 and insert the pin 56. With the brake still set by supplying brake fluid from source 44 to the hose 36, the take up shaft is advanced by rotation means 58 so that all of the wires are taut across the cutting frame. As may be seen the tension on the wires will be determined by the pressure within the hose 36. Then the machine is ready to operate.

With the extrusion line functioning and with the cutting and setting machine in operation, slugs 12 of clay or shale are being pushed at intervals by the pusher face 14, over the base platen 10, through the cutting wires 30. At this time the takeup spools 48 are inactive and the supply spools brake is set solid by means of the brake hoses 36, and by the front brake disc 42, in conjunction with the back brake plate 34.

After a predetermined number of slugs have been pushed through the cutting wires (depending on the nature of the material being worked) the fluid brakes are released, the take up drive shaft 50 rotates the takeup spools 48 and new cutting wire is drawn into service. Concurrently, worn wire is wound up out of the way on the takeup spools. To prevent setting machine shutdown at this point in the cycle, a broken wire sensor will be switched out of the circuit during the wire spooling interval. To reseat the broken wire sensors the brakes will be set a short time before the takeup spools stop rotating. This will draw the proper tension on the cutting wires, and allow the sensors to reset, whereupon the sensor system will be switched back into the run permit system. The entire wire spooling sequence will take place in a short period of time, (6-8 seconds), between pusher cycles so no loss of production will result due to "wire change".

The above wire spooling sequence will be controlled with established circuitry, well developed, and in no way a part of this invention.

Should a wire break in operation the machine is stopped by the sensors. Loose wire will be above the lower guide 46 and below top guide 60 for the reasons described. Then the wire is pulled across the frame and threaded through the top guide 60 and onto the take up spool and the machine started again as in the beginning.

The operation of the invention might be thought as having rolls of wire upon supply spool having these rolls of wire pulled across the cutting frame to a take-up roll which is on the take-up spools.

Figure 6:
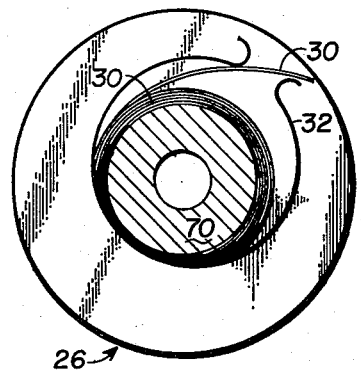
FIG. 6 is a cross-sectional view of a supply spool with only a small amount of cutting wire thereon.
Figure 4:
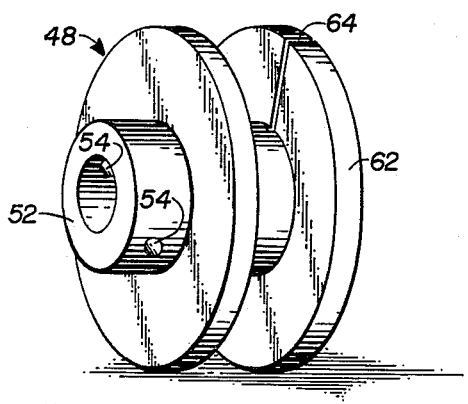
FIG. 4 is a perspective view of a take-up spool.
Figure 7:
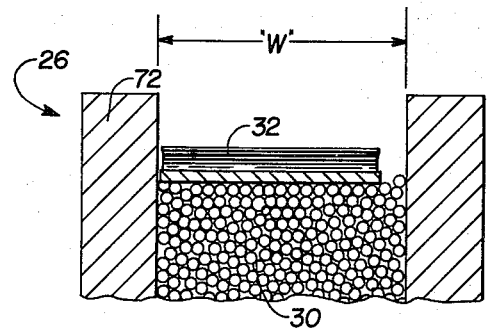
FIG. 7 is a partial sectional view of the supply spool full of wire as in FIG. 5, substantially on line 7—7 of FIG. 5.

Problems have been experienced with the high carbon steel cutting wire 30 unraveling from the supply spools 26 in transit. It will be understood that the wire 30 being high carbon is very much like a spring and therefore it is almost impossible without some restraing to retain upon the spool. It may be seen in FIGS. 5, 6, and 7 the spools themselves have hub 70 between two spool discs 72. The discs are spaced apart by a distance "w" which is the hub width. As may be seen the hub itself will have a certain diameter which is called the hub diameter and a certain circumference which is called the hub circumference. The disc 72 will have a certain diameter which will be the disc circumference. The wire 30 will have a certain diameter which is the wire diameter. When the wire is wound upon the spool it will be a diameter of the wire wound upon the spool. The flat spring 32 will extend substantially between the disc 72. However the width of the flat spring will be less than the hub width so that there is no binding. It will be noted that the width of the flatspring 32 is within three wire diameters of the width "w". Greater space between the spring 32 and the disc 72 would not properly hold the wire 30.

As an aid to correlating the terms of the claims to the exemplary drawing, the following catalog of elements is provided:

| 10 | base platen | 42 | brake disc |
|----|-------------|----|------------|
| 12 | slugs | 44 | brake fluid source |
| 14 | pusher face | 46 | lower guide |
| 16 | cutter frame | 47 | carbide insets |
| 18 | top roll | 48 | take up spool |
| 20 | bottom roll | 50 | take up shaft |
| 22 | upper spool frame | 52 | hub |
| 24 | lower spool frame | 54 | hole |
| 26 | spool supply | 56 | pin |
| 28 | axle | 58 | rotation mean |
| 30 | wire | 60 | top guide |
| 32 | spring | 62 | disc sliter |
| 34 | brake plate | 64 | slit |
| 36 | brake hose | 70 | hub |
| 38 | retain nut | 72 | disc |
| 40 | washer | w | hub width |

The embodiment shown and described above is only exemplary. I do not claim to have invented all the parts, elements or steps described. Various modifications can be made in the proportions, material, arrangement, and operation, and still be within the scope of my invention. The limits of the invention and the bounds of the patent protection are measured by and defined in the following claims. The restrictive description of the specific example above does not point out what an infringement of this patent would be, but are to enable the reader to make and use the invention.

I claim as my invention:

1. The process of making brick and tile including:
a. forming clay into slugs, and
b. cyclically pushing the slugs through a cutting frame having a plurality of cutting wires across it, thereby
c. cutting the slabs into units;
wherein the improved method comprises:
d. unrolling cutting wire from a supply roll on one side of the cutting frame across the cutting frame, and
e. winding the wire onto a take up roll on the other side of the cutting frame from the supply roll during a time when a slug is not being pushed.

2. The invention as defined in limitations a. through e. of claim 1 further comprising:
f. performing said winding step responsive to pushing slugs through the cutting frame so that after a set number of slugs have moved through the cutting frame, new wire is stretched across a portion of the cutting frame.

3. The invention as defined in limitations a. through e of claim 1 further comprising:
f. restraining the wire between the supply roll and cutting frame and g. restraining the wire between the cutting frame and take up roll so that a wire break at the cutting frame will not cause wire on the rolls to release.

4. The invention as defined in claim 1 having limitations
a. through e. further comprising: during that time when a slug is not being pushed
f. releasing a brake on the supply roll so that cutting wire may be unrolled therefrom,
g. rotating the take up roll to wind the wire thereon, and
h. resetting the brake before a slug is pushed through.

5. A brick and tile cutting and setting machine having
a. forming means for forming slugs of clay,
b. cutting wires extending across a cutting frame, and
c. push means for cyclically moving said slugs to and through the cutting wires,
wherein the improvement comprises:
d. a plurality of supply spools of new cutting wire,
e. wire extending from each of the supply spools to the cutting frame,
f. a take up spool for each of the supply spools, and
g. advance means operatively attached to the supply and take up spools for moving the cutting wire from each of the supply spools across the cutting frame and from the cutting frame to the take up spool said advanced means responsive to said push means so that after a set number of slugs have been moved through the cutting frame, the wire has moved the thickness of the slugs and so that the advanced means moves the wire when a slug is not being moved through the wires.

6. The invention as defined in limitations a. through g. of claim 4 wherein each of said supply spools has:
h. a hub with
 (i) a hub circumference and diameter
 (ii) a co-axial bore through the hub,
 (iii) a disc on each side of the hub with disc circumference, diameter and hub width between the discs, and
j. cutting wire wound on the hub of the spool
 (i) the wire within the confines of the discs both as to diameter and width so that the diameter of the wire wound on the spool is less than the disc diameter, and
 (ii) the wire having a wire diameter.

7. The invention as defined in limitations a. through g. of claim 4 further comprising:
h. a lower guide bar between the supply spools and cutting frame having
j. a hole therethrough for each cutting wire, and
k. a top guide bar between the cutting frame and take-up spools having
l. a hole therethrough for each cutting wire, and
m. a wire through each of the holes.

8. The invention as defined in limitations a. through g. of claim 4 further comprising:
h. a take-up shaft,
j. means for rotating said take-up shaft attached thereto,
k. means for releasably attaching each of the take-up spools to the take-up shaft.

9. The invention as defined in limitations a. through g. of claim 4 wherein said advance means includes:
h. brake hose adjacent to said supply spools, and
j. means for supplying fluid pressure to the brake hose to restrain rotation of the supply spool.

10. The invention as defined in limitations a. through j. of claim 9 further comprising:
k. a take-up shaft,
l. means for rotating said take-up shaft,
m. means for releasably attaching each of the take-up spools to the take-up shaft.

11. The invention as defined in limitations a. through m. of claim 10 further comprising:
n. a lower guide bar between the supply spools and cutting frame having
o. a hole therethrough for each cutting wire, and
p. a top guide bar between the cutting frame and take-up spools having
q. a hole therethrough for each cutting wire, and
r. a wire through each of the holes.

12. The invention as defined in limitations a. through r. of claim 11 wherein
t. a hub with
 (i) a hub circumference and diameter
 (ii) a co-axial bore through the hub,
 (iii) a disc on each side of the hub with disc circumference, diameter and hub width between the discs, and
u. cutting wire wound on the hub of the spool
 (i) the wire within the confines of the discs both as to diameter and width so that the diameter of the wire wound on the spool is less than the disc diameter, and
 (ii) the wire having a wire diameter.

13. A spool having
a. a hub with
 (i) a hub circumference and diameter,
 (ii) a co-axial bore through the hub,
 (iii) a disc on each side of the hub with disc circumference, diameter and hub width between the discs, and
b. cutting wire wound on the hub of the spool,
 (i) the wire within the confines of the discs both as to diameter and width so that the diameter of the wire wound on the spool is less than the disc diameter and,
 (ii) the wire having a wire diameter,
c. said cutting wire adapted to be stretched across the cutting frame of a brick and tile cutting and setting machine so that as slugs of clay are pushed through the cutting frame the cutting wire cuts them into individual bricks, and
d. said spool being adapted to be mounted on said brick and tile cutting and setting machine so that the cutting wire can be unwound from the spool across the cutting frame and onto a winding spool,
e. an arcuate flat spring over the wire,
 (i) the diameter of the spring when relaxed being less than the disc diameter and more than the hub diameter,
 (ii) the length of the spring being less than the circumference of the disc and more than the circumference of the hub,
 (iii) the length of the spring being less than the circumference of a circle having a diameter equal to the diameter of the relaxed spring,
 (iv) the width of the spring being less than the hub width between the discs.

14. The invention as described in limitations a. through e. of claim 13 further comprising:
f. the width of the spring being within three times the wire diameter of the hub width between the discs.

15. The invention as described in limitations a. through e. of claim 13 further comprising:
f. the diameter of the relaxed spring being less than the diameter of the wire wound on the spool, so that the wire wound on the spool is held in place by the spring.

16. The invention as described in limitations a. through f. of claim 15 further comprising:
g. the width of the spring being within three times the wire diameter of the hub width between the discs.

* * * * *